United States Patent [19]

Urbani

[11] Patent Number: 4,975,195
[45] Date of Patent: * Dec. 4, 1990

[54] APPARATUS AND METHOD FOR PROCESSING TRAP WASTES AND THE LIKE

[75] Inventor: William G. Urbani, Stockton, Calif.

[73] Assignee: Industrial Service Corporation, Stockton, Calif.

[*] Notice: The portion of the term of this patent subsequent to Mar. 3, 2004 has been disclaimed.

[21] Appl. No.: 130,751

[22] Filed: Dec. 9, 1987

Related U.S. Application Data

[63] Continuation-in-part of Ser. No. 881,885, Jul. 3, 1986, Pat. No. 4,719,015, which is a continuation-in-part of Ser. No. 736,629, May 25, 1985, Pat. No. 4,647,383.

[51] Int. Cl.$^5$ .................................................. C02F 1/02
[52] U.S. Cl. ..................................... 210/608; 210/613; 210/768; 210/774; 210/180; 210/182; 210/188; 210/259
[58] Field of Search ............... 210/179, 180, 181, 182, 210/188, 242.3, 608, 612, 613, 631, 703, 710, 764, 768, 769, 770, 771, 774, 776, 806, 259

[56] References Cited

U.S. PATENT DOCUMENTS

| | | | |
|---|---|---|---|
| 3,122,528 | 2/1964 | Hanesworth, Jr. | 210/776 |
| 3,203,893 | 8/1965 | House et al. | 210/703 |
| 3,617,539 | 11/1971 | Grutsch et al. | 210/776 |
| 4,185,680 | 1/1980 | Lawson | 210/613 |
| 4,248,709 | 2/1981 | Irving | 210/269 |
| 4,276,115 | 6/1981 | Greenfield et al. | 210/771 |
| 4,321,150 | 3/1982 | McMullen | 210/769 |
| 4,321,151 | 3/1982 | McMullen | 210/769 |
| 4,452,699 | 6/1984 | Suzuki et al. | 210/622 |
| 4,647,383 | 3/1987 | Urbani | 210/776 |
| 4,719,015 | 1/1988 | Urbani | 210/768 |

Primary Examiner—Richard V. Fisher
Assistant Examiner—Christopher Upton
Attorney, Agent, or Firm—Townsend and Townsend

[57] ABSTRACT

A method and apparatus for processing trap waste and the like into its component solids and liquids treatable in a sewage treatment plant includes a cooker, a solids separation system, and a digester. The cooker liquifies and renders trap waste obtained from, for example, restaurant traps by maintaining the waste at an elevated temperature and an elevated pressure to sterilize and separate the trap waste into solid and non-solid portions thereof. The solid separation system removes the solid and particulate matter from the liquified trap waste for disposal, preferably after washing the solids with treated water from the sewage treatment plant. The separated non-solid portion of the rendered trap waste is then communicated to a digester for either aerobic or anaerobic degradation; the digest is thereafter treated to remove additional solids. The remainder of the treated trap pumpings can then be processed in a sewage treatment plant with munipal or industrial sewage. Gases and vapors escaping the trap waste are recovered and cleaned by condensation, scrubbing, and/or incineration prior to release to the atmosphere.

19 Claims, 1 Drawing Sheet

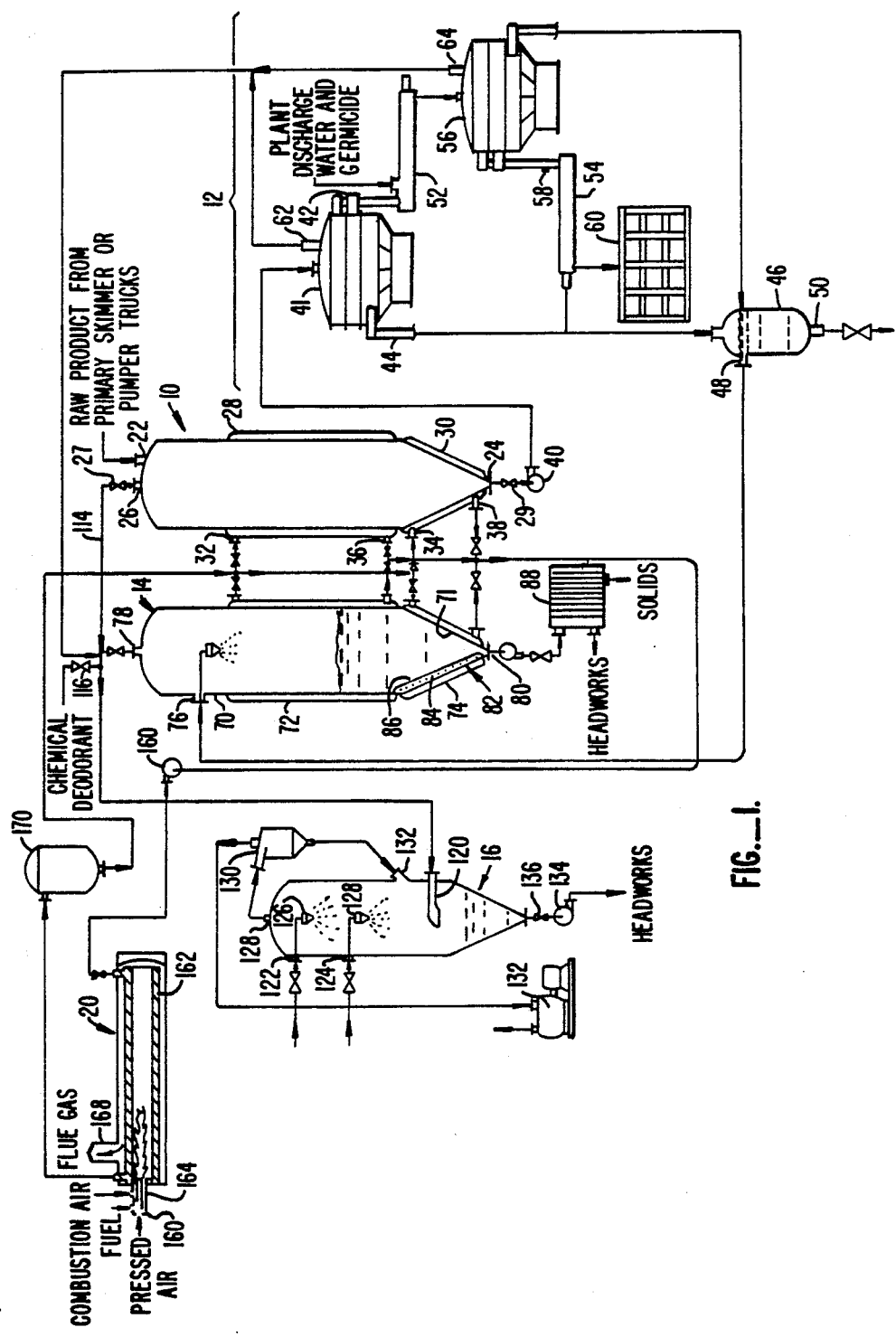
FIG._1.

APPARATUS AND METHOD FOR PROCESSING TRAP WASTES AND THE LIKE

This application is a continuation-in-part of application Ser. No. 881,885, filed July 3, 1986, now U.S. Pat. No. 4,719,015 which is a continuation-in-part of application Ser. No. 736,629, filed May 25, 1985, now U.S. Pat. No. 4,647,383.

BACKGROUND OF THE INVENTION

This invention relates to an apparatus and method for processing aqueous wastes containing fats, oils, and relatively large proportions of inorganic and organic solids: in particular, the invention relates to an apparatus and method for processing the waste which collects in traps such as restaurant traps. The purpose of this apparatus and process is to separate and treat the solids portion of these trap wastes so that they are acceptable for ordinary landfill disposal, to render the remainder of the trap wastes treatable in a typical sewage treatment plant.

Many institutions generate wastes which contains a high percentage (often as much as 50% or more) of mixed organic and inorganic solids as well as water, fats and oils, etc. One example of such wastes is that which collects in restaurant sink traps. This "trap waste" is periodically removed from such traps by pumping the semi-liquid waste into portable tanks or the like typically contains 40% to 60% or more of mixed inorganic and organic solids such as bones, paper, plastics, garbage, and the like, with the remainder constituting various amounts and types of fats, oils, grease, surfactants (soaps), and aqueous components. Such trap wastes or "trap pumpings" are typically relatively intractable and resistant to treatment in sewage treatment plants due in large part to the high proportion of solids present and the wide variety of substances found in such wastes. Until recently, the trap waste removed from, for example, restaurant traps was either disposed of by dumping or landfilling the trap waste, possibly after the removal of some of the aqueous components of the trap waste, or by drying and incinerating or burning the trap waste.

With increased interest in the environment and increased regulatory requirements for pollution abatement equipment, such methods of trap waste disposal are no longer practicable. Dumping or landfilling of trap waste is undesirable due to the potentially harmful environmental consequences, the continually increasing high cost of landfilling, and the increasingly limited locations in which such disposal is permitted. Burning of dewatered trap waste is possible, but, because of the very high incinerator temperatures that are required to completely combust the plastics typically found in trap waste, burning of large quantities of trap waste in a way that will meet regulatory requirements is generally infeasible. Further, incineration affects only part of the solids typically present in trap wastes.

SUMMARY OF THE INVENTION

A method and apparatus for processing trap waste are disclosed. The trap waste processor apparatus preferably includes a trap waste cooker, a solids separation system, and apparatus for digesting the non-solid portions of the trap waste. The trap waste cooker, or cooking tank, heats the trap waste obtained, for example, by removal from restaurant traps, by maintaining the raw trap waste at an elevated temperature and elevated pressure to liquify and sterilize the raw trap waste and render the raw trap waste separable into its solid and non-solid components. The solid separation system removes the solid and particulate matter from the thus liquified trap waste for disposal, preferably after washing the solids with treated water from the sewage treatment plant and a germicide.

The solid-free liquified trap waste is then transferred to a digester for microbial and/or enzymatic degradation of the fats, oils, and other organic wastes contained therein: the digester may be of either the aerobic or anaerobic type, and may include apparatus for agitating the mixture and/or introducing nutrient gases, (oxygen- or carbon dioxide- containing gases, respectively, for aerobic or anaerobic digestion). Thereafter, the digested, solid-free trap waste is returned, preferably after passage through a further solids separator to remove solids forming during digestion, to a sewage treatment plant for processing with municipal or industrial sewage.

The cooker, solids separation system, and digester will typically release significant quantities of gases and vapors. Preferably, these are treated by condensation, scrubbing, and/or incineration prior to release of these gases to the atmosphere. Accordingly, one embodiment of the apparatus according to the invention includes a condenser for separation of condensable vapors from non-condensable vapors: the former are deodorized or otherwise treated prior to disposal for treatment in a sewage treatment plant. In the condenser, the gases and vapors exiting the cooker, solids separation system, and digester are washed and cooled with water, e.g., treatment plant effluent, and deodorized by injection of a deodorizing chemical. The non-condensable components of the released gases and vapors may then released to the atmosphere, preferably following treatment with a deodorizing chemical. In many situations, it will be desirable to incinerate the non-condensable gases and vapors prior to release to the atmosphere, for combustion of noxious vapors, recovery of heat values and/or use as fuel for heating the various components of the apparatus. The non-condensable gases and vapors may also be scrubbed, either prior to or following incineration, with appropriate ones of a variety of gas scrubbers known to those skilled in the art, chosen according to the components of the non-condensable gases and vapors.

Preferably, the waste cooker and digester are heated with a heated exchange fluid, such as a high temperature oil, cycled through a heat exchanger. In the heat exchanger, the exchange fluid is heated to the desired elevated temperature with a burner utilizing, for example, diesel or other fuel, which may be supplemented by combustible gases released from the cooker, solids separation system, and digester. In alternative embodiments of the invention, other heat sources could be used, including arrangements in which separate heat sources are used to heat the trap waste cooker, vacuum dryer, and storage tanks.

The solids that are extracted from the trap waste according to the process of the present invention may be landfilled safely and inexpensively due to the treatment according to the present process and the relatively low volume of the extracted solids. The water and aqueous fractions removed by the process of the present invention can be treated in a conventional sewage treatment plant.

In addition, the apparatus disclosed is relatively inexpensive to operate; the primary expense is for fuel for heating the cooker and digester. The process is also non-polluting.

Following treatment of the trap waste using the present invention, it is necessary to dump or landfill only about 40–50% of the amount of trap waste which would have to have been so disposed of without the use of the invention. This 40–50% will be inert water wet solids which are compatible with any municipal landfill operation.

BRIEF DESCRIPTION OF THE DRAWING

FIG. 1 is a schematic drawing of one processor according to the invention.

DETAILED DESCRIPTION OF THE SPECIFIC EMBODIMENTS

One embodiment of the invention, shown schematically in FIG. 1, has a cooking tank 10 for liquifying and sterilizing the raw trap waste and rendering the raw trap waste separable into solid, and non-solid (fluid) components, a solids separation system 12 for separating the plastics and other solids from the aqueous and oily phases of the liquified trap waste, a digester 14, and a condenser 16 for liquefying water and other volatiles escaping cooking tank 10, solids separation system 12, and digester 14. The preferred embodiment also includes a heat exchanger 20 for providing heat to cooking tank 10 and digester 14. In alternative embodiments of the invention, however, other heat sources could be used, such as arrangements for individually heating cooking tank 10 and digester 14.

Cooking tank 10 is provided with an inlet 22 for introduction of raw trap waste from the primary skimmer of a sewage treatment system. Typically, the raw trap waste includes about 40–60% or more of mixed inorganic and organic solids such as bones, paper, plastics, garbage, and the like, with the remainder constituting various amounts and types of fats, oils, grease, surfactants (soaps), and aqueous components.; however, without further treatment, the trap waste mixture is not readily separable into components which can safely and conveniently disposed of by conventional methods. Treatment of the raw trap waste in cooking tank 10 renders the trap waste to enhance the separability of the solid and non-solid phases; this treatment also sterilizes the trap waste.

Cooking tank 10 also includes a liquified trap waste outlet 24, a gas relief outlet 26 equipped with a high pressure relief valve 27, and exchange fluid circulating jackets 28 and 30. Preferably, cooking tank 10 is a cylindrical tank having a conical lower end for efficient drainage of tank 10. Other designs and shapes suitable for cooking tank 10 are well known; alterations in tank design will require appropriate changes in the design of circulating jackets 28 and 30, which are formed to adapt to the particular shape of cooking tank 10. Drainage of tank 10 into solid separator 12 through liquified trap waste outlet 24 is controlled by outlet valve 29.

During the heat and pressure treatment of the raw trap waste from the primary skimmer of the sewage treatment system, substantial quantities of gas are typically evolved. Excess gas and pressure are released through gas relief outlet 26; the elevated pressure is maintained in the cooking tank 10 by high pressure relief valve 27, which is adjustable to maintain the desired pressure in tank 10. Typically, tank 10 is maintained at an elevated pressure of about 25 psi (pounds per square inch) during this stage of the trap waste treatment process.

Cooking tank 10 is maintained at an elevated temperature of about 200° F. (95° C.), preferably with a heated exchange fluid circulated through circulating jackets 28 and 30. Other temperatures may be used as long as the temperature is sufficiently high to sterilize and render the trap waste. These jackets 28 and 30 are in thermal contact with, are conformed to the exterior of, and cover most of the external surface area of, cooking tank 10. The exchange fluid, which will be described more fully below, is received from heat exchanger 20 into jackets 28 and 30 via inlets 32 and 34. The cooled exchange fluid is returned to heat exchanger 20 via outlets 36 and 38.

Following rendering and sterilization of the trap waste in cooking tank 10, the liquified trap waste is forwarded to solids separation system 12 using pump 40. Suitable pumps 40 for forwarding the heated slurry output of tank 10 to solids separation system 12 are well known.

Solids separation system 12 includes a solids separator 41 which substantially separates the trap waste solids from the aqueous and oily components of the liquified trap waste. The separated solids, which may be a sludge-like material, are produced at an outlet 42 for disposal or further processing, while the combined aqueous and oily phases of the liquified trap waste are removed from solids separator 41 through a fluids outlet 44. Solid separator 41 is of a conventional design, such as that described in U.S. Pat. Nos. 3,773,661 or 3,707,235. Suitable substitutes for solid separator 41 are well known.

Since the rate of output of fluids from solids separator 41 through fluid output 44 may be uneven, a surge tank 46 is (optionally) provided between fluid output 44 of solids separator 41 and digester 14. Surge tank 46 is equipped with an overflow outlet 48 and a drain 50; overflow outlet 48 provides a relatively even flow of fluids to digester 14.

Using the remaining components of solids separation system 12 shown in FIG. 1, the solids produced by solids separator 41 are preferably ground in grinder 52 after mixture with a germicide such as chlorine and water which may be, for example, sewage treatment plant discharge water, prior to disposal of the solids, although this is not necessary to the practice of the invention. The resulting slurry is introduced to a second separator 56, which conveniently is of the same type as solids separator 41. Water discharged from second separator 56 may be transferred for disposal in a sewage treatment plant or may be diverted through appropriate conduits (not shown) to digester 14 if the amount of disinfectant remaining in this discharge is not so high as to deactivate the enzymes or bacteria in digester 14. All free liquids are expelled from wet solids in expeller 54 connected to outlet 58 of solids separator 56. The solids produced by separator 56 through outlet 58 are collected in a disposal container 60 in a form suitable for ultimate disposal. Liquids obtained from separator 56 are combined with liquids from separator 41 and pumped to digester 14. Gases and vapors released by solid separators 41 and 56 through vents 62, 64 are diverted through conduit 66 for treatment with the other released gases and vapors in condenser 16.

Following solids removal, the non-solid portions of the trap waste rendered in cooking tank 12 are communicated from solids separator 41 (and/or solids separator 56) through, e.g., fluid output 44 (and optionally surge tank 46) to a digester 14. Following receipt of the fluid phases into digester 14 the organic components of the non-solid, rendered trap waste are broken down by generally known microbial and/or enzymatic degradation processes. Suitable digesters are generally present in sewage treatment plants and digester 14 conveniently may be one used for either aerobic or anaerobic digestion of sewage in a sewage treatment plant; the non-solid portions of the rendered trap waste are, in such an arrangement, digested along with other sewage.

The preferred digester 14 according to the invention will be of either the aerobic or anaerobic type and includes a tank 70 having a generally conical lower portion 71 and incorporating circulation jackets 72, 74 for heating tank 70. Digester 14 also includes, mounted to tank 70, an inlet 76 for introduction of the non-solid portions of the rendered trap waste into tank 70, a gas outlet 78 for removal of gases generated in digester 14 and/or added to hasten the decomposition process, a digest outlet 80 for removal of the digest, and an agitation mechanism 82. Although digester 14, if aerobic, could be open to the air, tank 70 preferably is fully enclosed except for the inlets and outlets 76, 78, 80. Jackets 72, 74 will be formed to allow circulation therethrough of a heated exchange fluid for maintaining digester 14 at the desired temperature, which will in turn depend on the type of digestion and bacteria an/or enzymes used for degradation. Typically, digester 14 will be maintained at about 95° F. (35° C.), although temperatures up to about 125°-130° F. (52°-54° C.) may be used depending on the identity of the dominant process microorganisms.

Agitation mechanism 82 includes at least one vane 84 mounted at the lower end thereof near digest outlet 80 and operable through rotary seals (not separately shown) by a suitable motor (not shown) to sweep about the conical lower portion 71 of tank 70 and thereby agitate the digest contained therein. Appropriate seals and motors for operating agitation mechanism 82 will be known to those skilled in the art. Other types of paddles or stirring structures which can be substituted for vane 84 will also be apparent to those skilled in the art. In the preferred apparatus according to the invention, vane 84 of agitation mechanism 82 is in addition at least partially hollow along a substantial portion or all of its length and perforated with small holes 86 along this hollow portion. An appropriate gas is pumped through vane 84 to exit through holes 86 to further agitate the digest in tank 70 and/or to add nutrient gases to the digest to hasten decomposition. Such gases may be introduced through the rotary seals (not shown) by means that will be apparent to those skilled in the art. For aerobic digestion, the gas so introduced will be air or oxygen, or another oxygen containing gas. For anaerobic digestion, the gas will be a hydrocarbon gas such as methane, carbon dioxide, or suitable mixtures of such gases. The non-solid portions of the rendered trap waste will be digested in digester 14 until all or a desired proportion of the organic matter contained therein has decomposed.

Unless such an existing digester 14 is used, so that the necessary bacteria and/or enzymes will be present in the sewage, it will generally be necessary to add appropriate bacteria, known to those skilled in the art, to the non-solid, rendered trap waste to effect digestion.

After digestion, the digest generally will contained solids formed during digestion. Following removal of the digest from digester 14 through digest outlet 80, these solids are preferably removed with solids separator 88. Because the proportion of solids that will be formed during digestion will be relatively small, solids separator 88 will be either of the filter press or centrifuge type; a solid separator 88 of the filter press type is indicated in FIG. 1. Solid separators 88 of each of these types, suitable for removal of solids from the digest, are generally known to those skilled in the art.

Following digestion and removal of solids formed in the digestion process, the solid-free digest is diverted to a treatment plant for processing with municipal or industrial sewage. Solids removed from the digest with solids separator 88 are suitable for landfill disposal.

The water and other volatile substances, removed from the digested non-solid phase of the trap waste are transferred to condenser 16 through vacuum line 114. Vacuum line 114 preferably also receives gases released through high pressure relief valve 27 from cooking tank 10 and the gases and vapors from solid separators 41, 56. A chemical deodorant, such as caustic soda, may be added to vacuum line 114 through valve 116 prior to reception into condenser 16.

Condenser 16 is maintained at an ambient temperature so that the condensable volatiles received into condenser 16 through manifold 120 are collected in condenser 16. Condenser 16 is also provided with inlets 122 and 124 and sprayers 126 and 128 for spraying the vapors and condensate with a chemical deodorant and a water rinse, respectively. Preferably, the chemical deodorant is caustic soda; suitable alternatives are well known. Water for washing the condensate and increasing the efficiency of condensation is conveniently derived from the treated water discharge from the sewage treatment plant.

Non-condensable gases and some mist are withdrawn from condenser 16 through outlet 128; passage of these vapors through a trap 130 isolates the non-condensable gases for removal via vacuum pump 132. In some embodiments of the invention, particularly where the digestion in digester 14 is accomplished anaerobically with or without the agitation of the digester with hydrocarbon gases such as methane, the non-condensable gases withdrawn with vacuum pump 132 will contain significant quantities of combustibles whose direct release to the atmosphere is undesirable. In such instances, it will be desired to remove such gases prior to release to the atmosphere; the preferred means of accomplishing such removal, for the overall efficiency of the operation of the processor, would be to feed the non-condensable gases into heat exchanger 20, discussed more fully below, thus incinerating such gases and recovering any heat values in the non-condensable gases. Condensable materials and mists or droplets are collected in trap 130 and returned to condenser 16 via return inlet 133. Trap 130 is preferably a cold trap, such as a tube type heat exchanger cooled with plant water; suitable substitutes will be apparent to those skilled in the art. Vacuum pump 132 is a liquid ring pump in the preferred embodiment.

Condensate collected in condenser 16 is removed through pump 134 controllably with a valve 136. The condensate can be returned to a treatment plant for processing with municipal or industrial sewage. In addition to or in place of condenser 16 or its components such as trap 130, gas scrubbers may be used to remove noxious or undesirable components of the gases and vapors prior to release of any of such gases to the atmosphere.

The heat exchanger system for maintaining cooking tank 10 and digester 14 at elevated temperatures includes, in addition to circulating jackets 28, 30, 72, and 74 discussed above, heat exchanger 20 and a pump 160 for circulating the exchange fluid through heat exchanger 20.

Heat exchanger 20 preferably utilizes a flame jet to heat the exchange fluid to the desired temperature of about 350° F. (ca. 175° C.). In the apparatus according to this invention, a heat exchanger with a capacity of about 2.5 million BTU has been found to be satisfactory. The exchange fluid is circulated in thermal contact with the flame through a jacket 162 and thence to cooking tank 10, vacuum dryer 14, and storage tank 18. The fuel burned in heat exchanger 20 is preferably diesel fuel or natural gas, but other suitable substitutes are well known. Combustible gases from condenser 16 may also be burned as fuel in heat exchanger 20, thereby providing some or all of the heat requirements for processor 10. Efficient and appropriate designs for jacket 162 within heat exchanger 20 will also be well known to those skilled in the art.

Air and fuel for burning within heat exchanger 20 are received into and burned using burner 164; depending on the fuel type, either the fuel or air may be mixed, as discussed above, with combustible non-condensable gases from condenser 16; for liquid fuels, such non-condensable gases will be mixed with the air fed into the burner for incineration. Preferably, the flame is directed along the length of the interior of jacket 162 with a stream of compressed air received in burner 164 via compressed air inlet 166. The exhausted gases from vacuum pump 132 can conveniently provide a source of compressed air for introduction into compressed air inlet 166. The combustion products of the flame are removed to the atmosphere via a flue 168.

Preferably, the heated exchange fluid may be stored in a reservoir 170 for circulation through the various jackets of cooking tank 10 and digester 14. Reservoir 170 also acts as an expansion chamber for the heat exchanger and associated circulating jackets and tubing.

The exchange fluid circulated through heat exchanger 20 and the associated conduits and circulating jackets is preferably a high temperature oil, such as Dow Therm ®, manufactured by Dow Chemical Company.

The temperatures maintainable in cooking tank 10 and digester 14 will depend on a variety of factors, including the length and insulation of the conduits in the heat exchanger system, the geometry and efficiency of heat transfer in heat exchanger 20, the quantity and rate of fuel combustion in burner 164, the rate of circulation of the exchange fluid through the system by pump 160, and other factors. As will be apparent to those skilled in the art, adjustment of some of these factors, especially the rate of fuel combustion, will allow the adjustment of the temperatures within cooking tank 10 and digester 14 to the desired temperatures.

Although the above description has generally been phrased in terms of a batch-type operation of the apparatus according to the invention, it will be apparent to those skilled in the art that apparatus according to the invention can be operated in a continuous manner. Further, it is specifically contemplated that the apparatus according to the invention may either be more or less permanently be associated with a sewage treatment plant or other similar waste facility or, alternatively, be portable. In such an instance, the various components of the apparatus could be mounted to a platform or other movable frame including tanks for storing the resulting solids and liquids for later disposal at, e.g., a landfill or sewage treatment plant, respectively. Further, although the above description of the preferred embodiments has specified "trap wastes" and "trap pumpings," it will be understood that the invention and appended claims are not so limited; the apparatus and method according to the invention may find use in treating other types of waste having large amounts of mixed inorganic and organic solids.

While the above is a complete description of the preferred embodiment of the invention, other arrangements and equivalents are possible and may be employed without departing from the true spirit and scope of the invention. For example, heat exchanging arrangements other than jackets may be used, such as conduits within the tanks carrying heated exchange fluid, so long as such arrangements are operable to establish sufficient heat transfer to warm the contents of the tanks to the desired temperatures. The sizes and configurations of most of the components of the preferred embodiment, in particular of the cooking tank 10 and digester 14 may be varied considerably. Similarly, the number and positioning of the tanks of each type is not critical. Therefore, the above description and illustration should not be construed as limiting the scope of the invention which is delineated by the appended claims.

What is claimed is:

1. An apparatus for processing trap waste comprising:
cooking means for maintaining the raw trap waste at an elevated temperature to render the trap waste separable into solid and liquified portions, the cooking tank having an inlet for receiving raw trap waste, a liquified trap waste outlet for discharging liquified trap waste from the cooking tank, and a gas outlet for removing gases escaping from the trap waste;
separator means coupled to the liquified trap waste outlet for receiving liquididified trap waste from the cooking means and for separating solids from the liquified portion of the trap waste;
digestion means fluidly coupled to the solids separator means for receiving and digesting the liquified portion of the trap waste; and
condenser means fluidly coupled to the digestion means for receiving gases escaping from the trap waste in the cooking means and gases released from the digestion means and for condensing at least a portion of the gases so received to form a condensate, the condenser means including a discharge outlet for discharging the condensate.

2. The apparatus according to claim 1 further comprising:
second solids separator means, fluidly coupled to the digestion means, for removing solids formed in the digestion means from the digested trap waste.

3. The apparatus of claim 1 further comprising a heat source.

4. The apparatus of claim 3 wherein the heat source is a heat exchanger and wherein the cooking means is operably coupled to the heat exchanger and includes jacketing means for circulating therethrough a heated exchange fluid and returning the exchange fluid to the heat exchanger, thereby maintaining the cooking means at an elevated temperature.

5. The apparatus according to claim 3 wherein the heat source is a heat exchanger and the digestion means is operably coupled to the heat exchanger and includes jacketing means for circulating therethrough a heated exchanger fluid and returning the exchanger fluid to the heat exchanger, thereby maintaining the digestion means at a digestion temperature.

6. The apparatus according to claim 1 wherein the digestion means includes agitation means for agitating the liquified portion of the trap waste received therein.

7. The apparatus according to claim 6 wherein the agitation means includes a van operable to rotate within the digestion means.

8. The apparatus according to claim 1 wherein the digestion means further includes means for introducing a gas into the digestion means.

9. The apparatus according to claim 8 wherein the gas contains oxygen.

10. The apparatus according to claim 8 wherein the gas contains carbon dioxide.

11. The apparatus according to claim 1 wherein the digestion means is an anaerobic digester.

12. The apparatus according to claim 1 wherein the digestion means is an aerobic digester.

13. The apparatus according to claim 1 further comprising flame heated heat exchanger means; wherein the condenser means includes for releasing its non-condensable portions of the gases received therein to the heat exchanger for incineration of any combustible components of the released gases.

14. The apparatus according to claim 1 further comprising scrubbing means for scrubbing at least a portion of the gases released from the cooking means and the condenser means.

15. The method of processing trap waste comprising steps of:
    cooking the trap waste at cooking temperature to render the trap waste separable into solids and a non-solid portion;
    separating the solids from the non-solid portion;
    digesting the non-solid portion; and
    condensing at least a portion of any gases escaping from the trap waste during the cooking and digesting steps.

16. A method of claim 15 wherein the cooking step is carried out at an elevated temperature; and wherein the digesting step is carried out at an elevated digestion temperature.

17. The method according to claim 15 wherein the digesting step is conducted anaerobically.

18. The method of claim 15 wherein the digesting step is conducted aerobically.

19. The method of claim 15 further comprising the step of:
    agitating the non-solid portion during the digesting step.

* * * * *